United States Patent
Luna Arriaga

(10) Patent No.: US 11,738,767 B2
(45) Date of Patent: Aug. 29, 2023

(54) VEHICULAR DRIVER ASSIST SYSTEM USING ACOUSTIC SENSORS

(71) Applicant: Magna Electronics Inc., Auburn Hills, MI (US)

(72) Inventor: Antonio Luna Arriaga, Rochester Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 127 days.

(21) Appl. No.: 17/304,140

(22) Filed: Jun. 15, 2021

(65) Prior Publication Data

US 2021/0387634 A1    Dec. 16, 2021

Related U.S. Application Data

(60) Provisional application No. 62/705,204, filed on Jun. 16, 2020.

(51) Int. Cl.
| | |
|---|---|
| *G08G 1/00* | (2006.01) |
| *B60W 50/14* | (2020.01) |
| *B60Q 9/00* | (2006.01) |

(52) U.S. Cl.
CPC ............. *B60W 50/14* (2013.01); *B60Q 9/008* (2013.01); *B60W 2420/42* (2013.01); *B60W 2420/52* (2013.01); *B60W 2420/54* (2013.01); *B60W 2540/20* (2013.01); *B60W 2552/35* (2020.02); *B60W 2554/4041* (2020.02); *B60W 2554/4042* (2020.02); *B60W 2554/4045* (2020.02)

(58) Field of Classification Search
CPC ............. B60W 50/14; B60W 2420/42; B60W 2420/52; B60W 2420/54; B60W 2540/20; B60W 2552/35; B60W 2554/4041; B60W 2554/4042; B60W 2554/4045; B60W 2554/802; B60W 2554/804; B60W 30/18163; B60Q 9/008
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,761,630 A * | 6/1998 | Sekine ................. G05D 1/0278 701/301 |
| 5,949,331 A | 9/1999 | Schofield et al. |

(Continued)

*Primary Examiner* — Toan N Pham
(74) *Attorney, Agent, or Firm* — HONIGMAN LLP

(57) ABSTRACT

A vehicular driving assistance system includes a plurality of sensors disposed at a vehicle and sensing respective regions exterior of the equipped vehicle. A plurality of microphones is disposed at the equipped vehicle and sense sounds emanating from exterior of the vehicle. An ECU, responsive to indication of an intended lane change of the equipped vehicle, and via processing of sensor data captured by at least one of the sensors, determines presence of another vehicle in an adjacent traffic lane. Responsive to determination of the presence of the other vehicle in the adjacent traffic lane, the ECU, via processing outputs of at least one microphone of the plurality of microphones, determines if the determined other vehicle is accelerating. Responsive to determination that the determined other vehicle is accelerating, the vehicular driving assistance system generates an alert to the driver of the equipped vehicle.

21 Claims, 3 Drawing Sheets

(56) References Cited

U.S. PATENT DOCUMENTS

| | | |
|---|---|---|
| 6,278,377 B1 | 8/2001 | DeLine et al. |
| 7,038,577 B2 | 5/2006 | Pawlicki et al. |
| 7,657,052 B2 | 2/2010 | Larson et al. |
| 7,720,580 B2 | 5/2010 | Higgins-Luthman |
| 7,855,755 B2 | 12/2010 | Weller et al. |
| 8,976,040 B2 * | 3/2015 | Ray Avalani ............ B60Q 9/008 348/148 |
| 10,328,973 B2 * | 6/2019 | Chan .................... B62D 15/029 |
| 2013/0321615 A1 * | 12/2013 | Schofield ................ G08G 1/163 348/118 |
| 2016/0029111 A1 | 1/2016 | Wacquant et al. |
| 2016/0349219 A1 | 12/2016 | Paturle et al. |
| 2018/0211528 A1 | 7/2018 | Seifert |
| 2018/0335503 A1 | 11/2018 | Seifert et al. |
| 2019/0329777 A1 * | 10/2019 | Rajab ................ B60W 50/0097 |

\* cited by examiner

US 11,738,767 B2

VEHICULAR DRIVER ASSIST SYSTEM USING ACOUSTIC SENSORS

CROSS REFERENCE TO RELATED APPLICATION

The present application claims the filing benefits of U.S. provisional application Ser. No. 62/705,204, filed Jun. 16, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Microphones are also known, such as microphones inside of a vehicle, such as described in U.S. Pat. Nos. 7,657,052 and 6,278,377, which are hereby incorporated herein by reference in their entireties.

SUMMARY OF THE INVENTION

A driver or driving assistance system for a vehicle utilizes one or more cameras to capture image data representative of images exterior of the vehicle, and provides a microphone disposed at or incorporated in at least some of the exterior cameras. The cameras capture image data for a surround view or bird's-eye view display of the vehicle surroundings, and the microphones determine sounds at or near the vehicle. The system processes outputs of the microphones to determine sounds and to determine a location of the source of the sounds relative to the vehicle, such as an angle and/or distance of the source of the sounds relative to the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
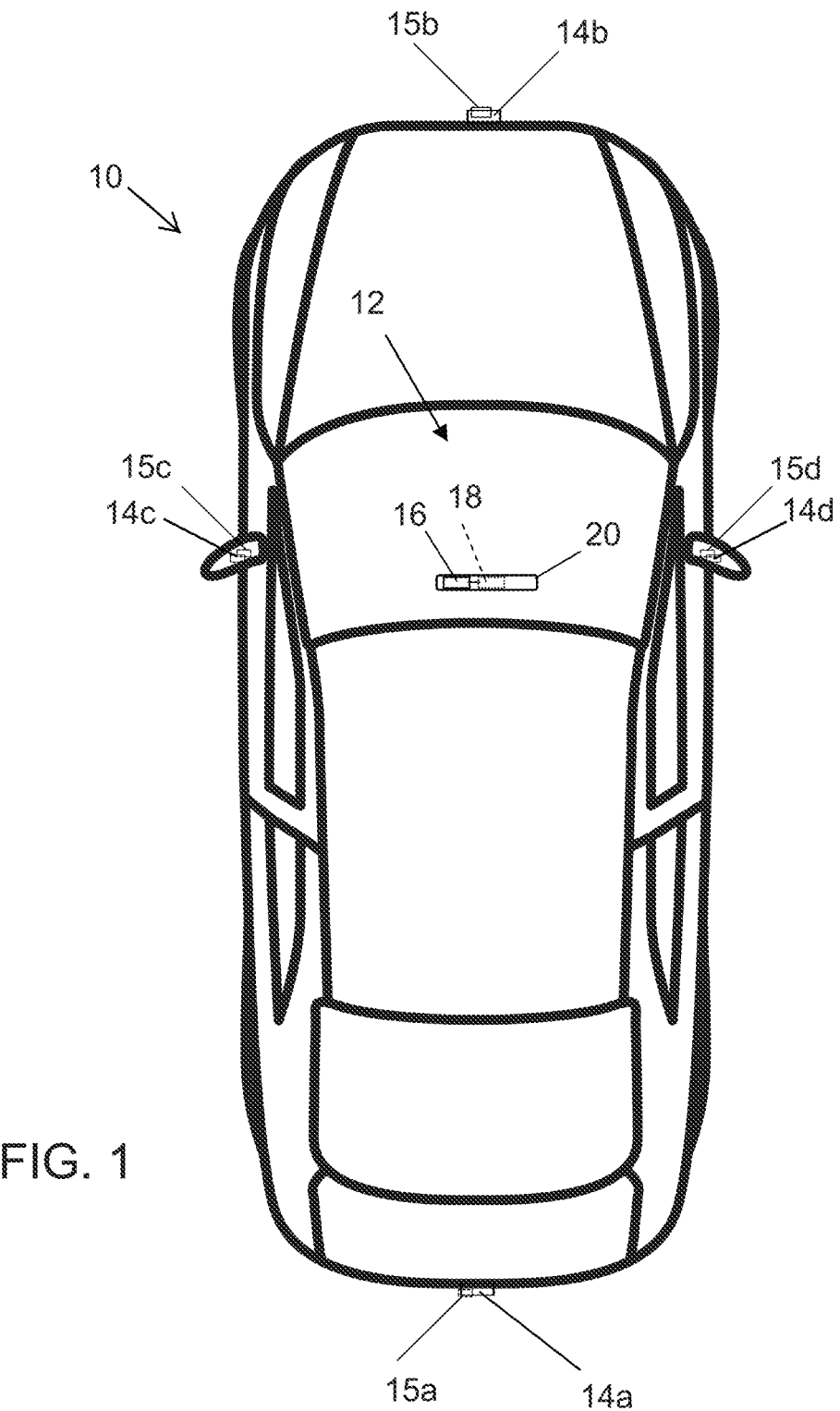
FIG. 1 is a plan view of a vehicle with a driver assist system and a plurality of cameras and microphones.

Referring now to the drawings and the illustrative embodiments depicted therein, a vehicle 10 includes an imaging system or driving assist system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens or lens assembly for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. The surround vision cameras include a microphone module 15a, 15b, 15c, 15d disposed at or incorporated in a respective one of the cameras 14a, 14b, 14c, 14d (shown in all of the cameras 14a-d, but optionally disposed at or incorporated into only some of the exterior vehicle cameras), as discussed below.

The system may include aspects of the sound systems described in U.S. Pat. Nos. 7,657,052 and 6,278,377 and/or U.S. Publication Nos. US-2018-0335503; US-2018-0211528; US-2016-0029111, which are hereby incorporated herein by reference in their entireties.

It is desirable for vehicle systems to be able to acoustically sense their environment to emulate a sense that the human driver uses to navigate a vehicle through traffic. The vehicle system can then 'listen,' such as to identify emergency vehicle sirens or other vehicles sounding their horn to warn of danger. The system may communicate acoustically with a pedestrian (the vehicle could stop at a pedestrian crossing, it could use a loudspeaker to tell the pedestrian that it will wait for the pedestrian and then process a verbal response from the pedestrian). The vehicle system may be able to sense or determine the direction of sound and may be able to determine how far away the source of the sound is from the vehicle. Additionally, camera systems of vehicles may not always reliably determine conditions (such as distance and relative speed) of detected objects and vehicles, such as due to warped or low resolution images or occlussions at the lens of the camera. Thus, acoustic signals may be used to at least in part determine conditions of detected objects and vehicles.

The system may use at least one microphone configured to detect acoustic signals originating exterior the vehicle to detect, locate, and/or determine relative velocity of other vehicles and objects exterior the equipped vehicle. At least three microphones may be used at the vehicle to triangulate a location of the source of detected sound and it would be advantageous to have even more than three microphones installed at the vehicle. Preferably, the addition of microphones can still keep the wiring harness effort to a minimum. In other words, disposing microphones at the cameras of the vehicle (such as integrated components or accessories) may reduce the need for substantial changes to a traditional vehicular wiring harness. Also, for microphones that are exposed exterior the vehicle, they are configured to withstand the harsh environment and are durable such that may survive in working condition for at least ten years.

The system provides the addition of a microphone to a vehicle surround view camera (or other exterior viewing camera disposed at an exterior portion of the vehicle, such as one or more camera monitoring system (CMS) cameras and/or the like). Surround view systems utilize at least four and up to six (or more) cameras placed around the vehicle. The placement at different predefined locations at the vehicle allows the system to use the microphones to precisely triangulate sound sources. The microphone may send the digital signal through an amplifier directly into a microcontroller input where the pulse density signal is processed and then modulated on the regular camera data stream. The signal travels through the camera digital data medium (co-axial cable or automotive Ethernet) to a central ECU where the signals from all four to six microphones (with one such microphone at or incorporated in each of the four to six exterior cameras) are processed by a digital signal processor (DSP). The DSP performs the signal classification and may utilize triangulation to determine the signal direction and distance. Thus, the system may detect presence of an object or other vehicle from which sound is emanating and determine the location of the detected object or vehicle via processing of audio data captured by the microphones.

As the vehicle 10 is driven along the road, the cameras and microphones function to detect objects and other vehicles at or near the vehicle 10. The microphone system (comprising the microphones and the ECU with DSP) may, independent of the camera system, detect objects and other vehicles in proximity to the equipped vehicle and determine distance and/or relative velocity of the other vehicle and objects to the equipped vehicle. The microphone system may also work in conjunction with a camera or sensor system to supplement determinations made by the other systems of the vehicle. For example, another vehicle may be detected via image processing of image data captured by the cameras (such as a sideward and rearward viewing camera) at the equipped vehicle, with the microphone system being implemented to determine acceleration or deceleration of the detected other vehicle.

Audio data captured at the microphones representative of the other vehicle may be processed at the ECU such as to locate the other vehicle relative to the equipped vehicle, determine an acceleration/decceleration condition of the vehicle, and/or determine a relative velocity of the vehicle. Based on the processed audio data, an output may be generated relating to a condition of the detected vehicle, such as an alert to the driver of the equipped vehicle. Processing of the audio data may provide a different output based on a current state of the equipped vehicle.

Figure 2:
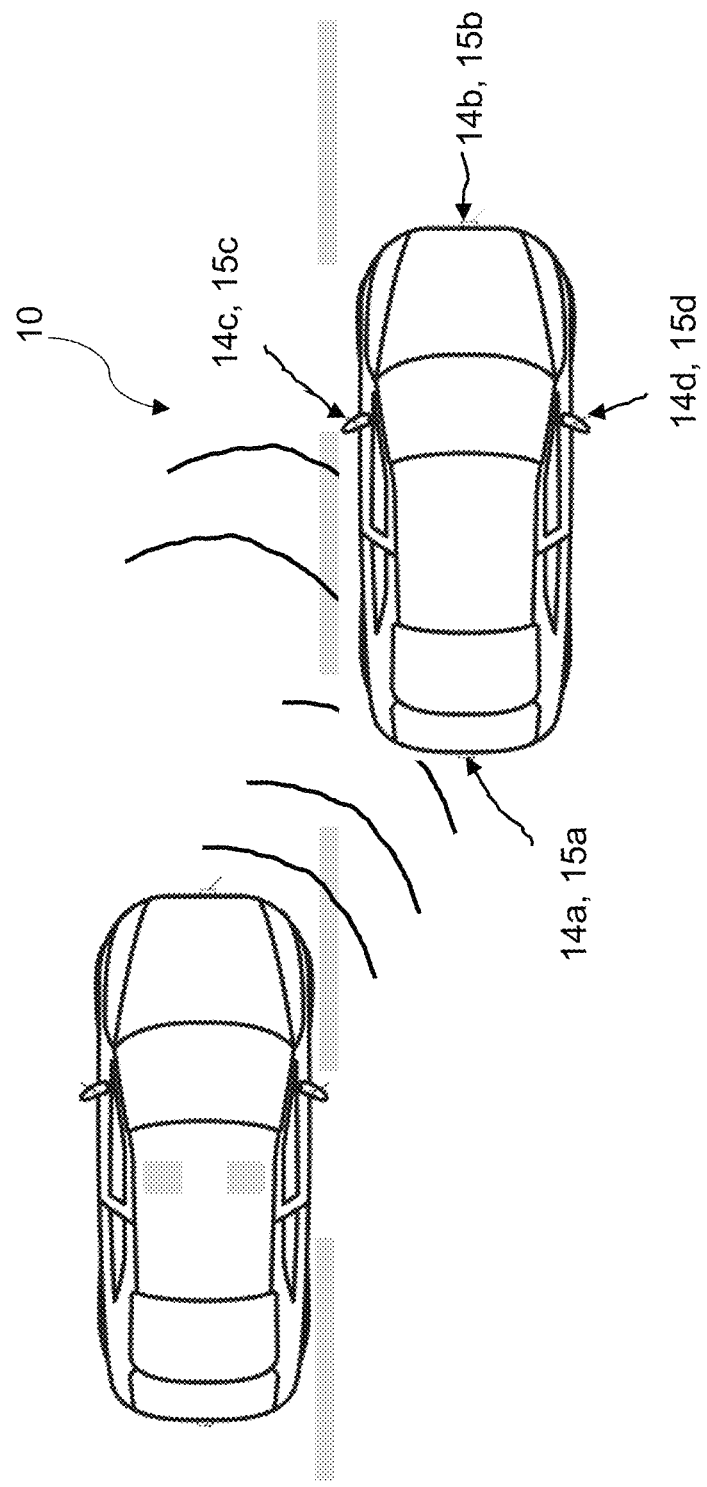
FIG. 2 is a plan view of the vehicle as it is driven along a road, shown with another vehicle approaching from the side and rear of the equipped vehicle.

For example, and such as shown in FIG. 2, if the driver of the vehicle 10 tries to change lanes into the traffic lane to the left of the lane in which the vehicle is traveling (such as may be indicated by activation of a turn signal), the microphone system can determine if the detected vehicle on the left is accelerating such that the other vehicle would block the merge or lane change of the equipped vehicle and thus a lane change may not be completed safely. Via processing of audio signals, the system may also determine if the vehicle on the left slows down or travels at a constant speed such that the merge or lane change may be completed or will become possible once sufficient space is available in the adjacent lane. The microphone system can also determine a safe lane change based on other determined conditions of the other vehicle, such as if the other vehicle sounds its horn. The system may notify the driver of the equipped vehicle (such as via a visual indication that is viewable by the driver or an audio indication) if the approaching vehicle precludes a safe lane change, such as determined if the other vehicle sounds its horn or if the other vehicle accelerates to block the merge or lane change or make the merge or lane change unsafe.

Figure 4:
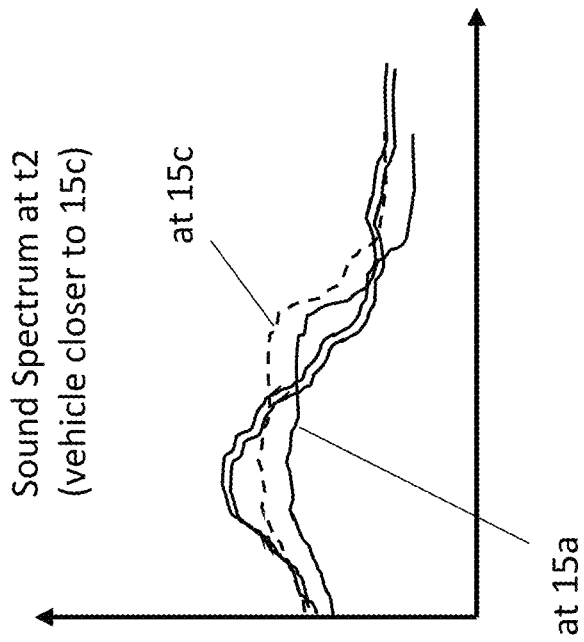
FIG. 4 is a graph showing sound spectrums at the microphones at a time t2 where the other vehicle is nearer to the side of the equipped vehicle than at t1.
Figure 3:
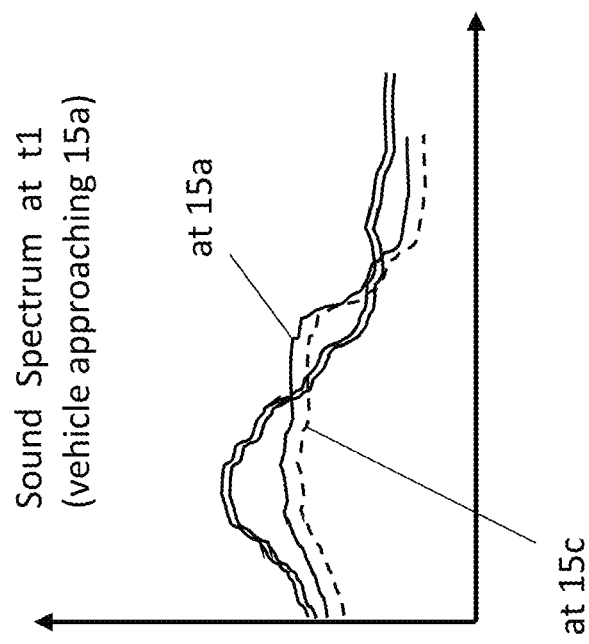
FIG. 3 is a graph showing sound spectrums at the microphones at a time t1 where the other vehicle is approaching from the side and rear of the equipped vehicle.

The vision system coupled with surround sound detection assists the driver of the equipped vehicle by detecting potential threats signaled by acoustic waves. The microphone array can determine the direction of arrival of the acoustic waves via signal processing algorithms. As can be seen with reference to the sound spectrum graphs of FIGS. 3 and 4, the system can determine when another vehicle is closer to the microphone 15a at the rear camera (FIG. 3) or closer to the microphone 15c at the side camera (FIG. 4). For a situation in which the equipped vehicle encounters a rearward approaching vehicle (such as shown in FIG. 2), the graph of FIG. 3 would be representative of sounds captured at the equipped vehicle at a first time t1 and the graph of FIG. 4 would be representative of the sounds captured at the equipped vehicle at a second time t2, where the rearward approaching vehicle is closer to the side of the equipped vehicle at t2 as it overtakes and passes the equipped vehicle.

As shown, the audio captured at microphones 15a and 15c may be determined by the system as representative of sounds originating from the detected approaching vehicle because the microphones 15a, 15c are closest to the detected vehicle and have similar traces. As the vehicle gets closer to microphone 15c at the side of the vehicle and further from the microphone 15a at the rear of the vehicle, the volume of the audio captured at the microphone 15c increases relative to the volume of the audio captured at the microphone 15a. Thus, the system may determine that the vehicle is accelerating in this situation. When the volume captured by microphone 15c is larger than the volume captured by microphone 15a (FIG. 4), the vehicle is closer to the microphone 15c than to the microphone 15a.

Optionally, the system may include a single microphone integrated with a camera of a surround view system or disposed separate from the cameras at the vehicle such as to determine velocity of detected objects relative to the equipped vehicle. For example, the system may use cameras to detect other vehicles proximate to the equipped vehicle and capture and process audio data representative of the detected vehicle to determine if the vehicle is accelerating or decelerating (and/or at what rate) relative to the equipped vehicle.

The system can learn the acoustic signature of the vehicle and may adapt the acoustic signature for the road conditions of the road along which the vehicle is traveling. Such road conditions or road roughness or road type may be determined via vision-based road roughness detection or via inputs from other systems of the vehicle. For example, a system of the vehicle (such as a rain sensing system) may determine that it is raining and that there are wet road conditions. Road roughness, road conditions, and road type may independently and collectively affect the acoustic signature. For example a concrete road, an asphalt road, and a dirt road may each have different base line acoustic signatures relative to one another and wet or snowy conditions or objects in the road (such as leaves) may further alter the acoustic signature. Such categorization of the road type and road condition may help the system to more quickly distinguish sounds emanating from objects and/or other vehicle surrounding the equipped vehicle from the road noise. Thus, the system can adapt the acoustic signature of the equipped vehicle for the road along which it is traveling so that changes in the acoustic signature of the equipped vehicle will not impair the system's ability to detect acceleration or other sounds emanating from other vehicles traveling along the road.

Optionally, the system may use road roughness characteristics to learn the acoustic road/tire signature for the equipped vehicle. Thus, the system can determine and ignore or cancel out the acoustics generated by the tire-road interface of the equipped vehicle itself and can more readily determine noises generated by the detected other vehicle. For example, if the driver of the equipped vehicle signals a lane merge (e.g., to the traffic lane to the left of the lane in which the vehicle is traveling), the microphone(s) at the opposite side of the lane merge (e.g. at the right side of the vehicle) detects the tire-road interface acoustic signature (generated by the tires as they roll along the road) and the system can cancel out noises detected by the left and rear microphones that are indicative of the determined equipped vehicle's own tires rolling along the road. Thus, the microphones nearest to the detected object or other vehicle can more easily separate and process audio data from the detected object or other vehicle, such as to more readily detect if the other vehicle is actually accelerating or slowing down.

Thus, the system determines (and may generate an alert to the driver of the equipped vehicle) potential threats signaled by acoustic waves from other vehicles, such as for determining if it is safe for the equipped vehicle to change lanes when another vehicle is present in the adjacent lane. The system may first determine presence of the other vehicle, such as via image processing of image data captured by a sideward and rearward viewing camera and/or via data processing of sensor data captured by a non-imaging sensor, such as a radar sensor or lidar sensor or ultrasonic sensor or the like. Responsive to determination of presence of the other vehicle (such as in conjunction with a lane change assist system and optionally responsive to actuation of a turn signal indicator by the driver of the vehicle to indicate an intended lane change), the microphone system may operate to determine a condition of the other vehicle that may preclude a safe lane change, such as if the detected other vehicle is accelerating to block an intended merge or lane change or that the other vehicle sounded its horn. If the microphone system determines, via processing of audio data, that a lane change may not be safely executed such as if the other vehicle is accelerating or sounded its horn, the system may generate an audible or visual alert to the driver of the equipped vehicle.

The external microphones are coupled with the respective cameras to detect specific sounds and their incidence angle relative to the equipped vehicle. Improper lane change behaviors can be a major cause of traffic flow disruptions and even crashes. Rule-based methods tend to exhibit limited performance due to uncertainty and complexity of driving environment. The system provides further determination of the behavior of other vehicles at or near or approaching the equipped vehicle to determine if it is safe for the equipped vehicle to merge or make a lane change into an adjacent traffic lane, particularly when the system has (via other sensors) determined presence of another vehicle in that traffic lane.

The microphone may be disposed inside the camera enclosure acoustically coupled to the lens assembly of the camera or may be placed right next to the lens (such as at or near an outermost lens optic of the lens assembly) in order to interface to the outside of the vehicle in the same way the lens interfaces with the vehicle outside.

Optionally, the system may selectably process audio data captured by the microphones, such as responsive to receiving a signal that a camera or sensor system of the vehicle is compromised. For example, a vision system of the vehicle may determine that captured camera data is compromised (such as via blurred image data, an occlusion at the lens, and the like) and the microphone system may begin processing audio data such as to supplement the vision system in determining relative speed of an approaching vehicle.

Optionally, the system may communicate with an autonomous driving system of the vehicle. Autonomous driving systems typically provide highly accurate sensor and detection systems, such as lidar and/or radar sensors at the vehicle, to enable the vehicle to maneuver around its environment. Inclusion of the microphone system enables an autonomous driving system to provide more accurate determinations of objects and other vehicles within the environment, such as by processing audio data captured by the microphones to independently or conjunctively determine presence and conditions of detected objects and vehicles or as a check or backup option should other systems prove unreliable or fail (such as if lenses of a camera system become occluded). In such examples, the system may determine presence and/or a condition of a detected vehicle and communicate the determination to the autonomous driving system of the vehicle. For example, the system, responsive to indication of an intended lane change from an autonomous driving system of the vehicle, may determine presence of another vehicle in a side lane adjacent to the traffic lane in which the equipped vehicle is travelling. Responsive to sensing the presence of the other vehicle, the system determines via processing sensor data captured by the microphones of the equipped vehicle whether the other vehicle is accelerating in such a way that would block the intended lane change or make the lane change unsafe. If the other vehicle is accelerating in a way that would block the lane change or make the lane change unsafe, the system may generate and communicate a signal to the autonomous driving system to not complete the lane change.

For autonomous vehicles suitable for deployment with the system, an occupant of the vehicle may, under particular circumstances, be desired or required to take over operation/control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system.

The system thus uses a microphone at or in or integrated with one or more (and preferably all) of the exterior cameras that capture image data for a surround view display derived from the captured image data or that capture image data for a rearward and/or sideward camera monitoring system (CMS) of the vehicle. The microphone may be disposed inside the camera enclosure and acoustically coupled to the lens assembly or may be placed right next to the lens in order to interface to the outside of the vehicle in the same way the lens interfaces with the vehicle outside. The system thus includes cameras that capture image data for a surround view display system and/or camera monitoring systems and that include microphones for sensing sounds at or near and exterior of the vehicle. By processing the sound signals from the multiple microphones, the system can classify the sound source and/or can determine the direction to the sound source and/or can determine the distance from the vehicle to the sound source.

Thus, the microphone system is implemented to determine acceleration or deceleration of other vehicle detected using a camera or sensor system of the vehicle. The system may notify the driver of a condition of the equipped vehicle determined via processing of audio data, such as if the other vehicle sounds its horn or accelerates in a way that blocks the equipped vehicle's merge or lane change or that makes the merge or lane change unsafe. Furthermore, the system can adapt the acoustic signature of the equipped vehicle for the road along which it is traveling so that changes in the acoustic signature of the equipped vehicle will not impair the system's ability to detect acceleration or other sounds emanating from other vehicles traveling along the road.

The microphone may be disposed in a camera and can interface with the camera electronics (at a different carrier frequency). As shown in FIGS. 1 and 2, the vehicle may include multiple external cameras with microphones. The external cameras include the microphone and camera circuitry that filters, digitizes and transmits audio data (along with image data captured by an imager and lens of the camera). The domain controller interface may comprise an LVDS interface, and may filter and digitize audio signals and transmit on existing LVDS pairs or on additional LVDS pairs. The microphone may comprise any suitable microphone, and may have an estimated maximum frequency at around 10 KHz.

The microphone may be packaged in the camera, such as a 1 MPixel camera or a 2 MPixel camera or a 4 MPixel camera (or any number of mega pixels depending on the application). The imager and microphone may be connected to a serializer (with the imager, microphone and serializer being part of the camera/microphone module at or near an exterior portion of the vehicle), which is connected (via an LVDS coaxial cable) to a deserializer and system on chip or microprocessor with the desired or appropriate algorithm (with the deserializer and SoC or microprocessor being located remote from the camera module, such as at a system control unit or the like).

The driving assistance system provides the ability to mount a microphone in a camera and send audio data to an ECU. The system may also determine siren signals and may distinguish sirens of emergency vehicles from other sounds or noises. The bandwidth of siren signals may be determined to accommodate or determine siren types globally. The system may also account for Doppler effects. The system may determine the Signal to Noise ratio of the siren signals in the environment the microphone is exposed to, including wind noise associated with the vehicle velocity, the location of the sensor(s), the noise associated with trains, community defense sirens (e.g., used to warn of upcoming or imminent tornadoes, monthly tests, etc.), jack hammers used during road and building construction, etc. The microphone may be mounted in a sealed camera package, and multiple camera/microphone units may be mounted at selected locations on the vehicle. The system thus may determine various noises exterior the vehicle (and direction and distance to the source of the noise(s)), and may generate an alert to an occupant or driver of the vehicle as to the type of noise detected and direction or location of the source of the noise. The alert may be provided as an audible alert or visual alert (such as an icon or message displayed at the display screen in the vehicle).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assistance system, the vehicular driving assistance system comprising:
   a plurality of sensors disposed at a vehicle equipped with the vehicular driving assistance system, each sensor of the plurality of sensors sensing a respective region exterior of the equipped vehicle;
   an electronic control unit (ECU) comprising electronic circuitry and associated software, the electronic circuitry comprising a data processor for processing sensor data captured by the sensors;
   a plurality of microphones disposed at the equipped vehicle and sensing sounds emanating from exterior of the vehicle;
   wherein the ECU comprises a sound processor operable to process outputs of the plurality of microphones;
   wherein, with the equipped vehicle traveling along a traffic lane of a road, the ECU, responsive to indication of an intended lane change of the equipped vehicle, and via processing at the data processor of sensor data captured by at least one sensor of the plurality of sensors, determines presence of another vehicle in a side traffic lane adjacent to the traffic lane in which the equipped vehicle is traveling;
   wherein the intended lane change is indicated by an autonomous driving system of the vehicle;
   wherein, responsive to determination of the presence of the other vehicle in the side traffic lane, the ECU, via processing an output of at least one microphone of the plurality of microphones, determines if the determined other vehicle is accelerating;
   wherein the ECU, responsive to determination of the presence of the other vehicle in the side traffic lane, determines a tire-road acoustic profile for the equipped vehicle, and wherein the ECU determines if the determined other vehicle is accelerating by canceling out the determined tire-road acoustic profile from the output of the at least one microphone; and
   wherein, responsive to determination that the determined other vehicle is accelerating, the vehicular driving assistance system generates an alert to a driver of the equipped vehicle.

2. The vehicular driving assistance system of claim 1, wherein the ECU determines the tire-road acoustic profile for the equipped vehicle via processing at the ECU of an output of another microphone of the plurality of microphones that is disposed at the other side of the equipped vehicle from the side traffic lane in which the determined other vehicle is traveling.

3. The vehicular driving assistance system of claim 1, wherein the determined tire-road acoustic profile is based at least in part on a determined road condition of the road along which the vehicle is travelling.

4. The vehicular driving assistance system of claim 1, wherein, responsive to determination of the presence of the other vehicle in the side traffic lane, the ECU, via processing of outputs of the at least one microphone of the plurality of microphones, determines if the determined other vehicle sounds its horn.

5. The vehicular driving assistance system of claim 1, wherein the sensors comprise exterior viewing cameras disposed at the equipped vehicle.

6. The vehicular driving assistance system of claim 5, wherein the microphones and the respective exterior viewing cameras share common circuitry.

7. The vehicular driving assistance system of claim 5, wherein each microphone of the plurality of microphones is disposed inside a camera housing of the respective camera.

8. The vehicular driving assistance system of claim 1, wherein the plurality of sensors comprises a plurality of radar sensors disposed at the equipped vehicle.

9. The vehicular driving assistance system of claim 1, wherein the plurality of sensors comprises a plurality of lidar sensors disposed at the equipped vehicle.

10. The vehicular driving assistance system of claim 1, wherein, responsive to determination that the determined other vehicle is accelerating, the vehicular driving assistance system generates a signal to the autonomous driving system to not complete the intended lane change.

11. A vehicular driving assistance system, the vehicular driving assistance system comprising:
a plurality of sensors disposed at a vehicle equipped with the vehicular driving assistance system, each sensor of the plurality of sensors sensing a respective region exterior of the equipped vehicle;
an electronic control unit (ECU) comprising electronic circuitry and associated software, the electronic circuitry comprising a data processor for processing sensor data captured by the sensors;
a plurality of microphones disposed at the equipped vehicle and sensing sounds emanating from exterior of the vehicle;
wherein the ECU comprises a sound processor operable to process outputs of the plurality of microphones;
wherein, with the equipped vehicle traveling along a traffic lane of a road, the ECU, responsive to indication of an intended lane change of the equipped vehicle, and via processing at the data processor of sensor data captured by at least one sensor of the plurality of sensors, determines presence of another vehicle in a side traffic lane adjacent to the traffic lane in which the equipped vehicle is traveling;
wherein the intended lane change is indicated via activation of a turn signal by a driver of the equipped vehicle;
wherein, responsive to determination of the presence of the other vehicle in the side traffic lane, the ECU, via processing an output of at least one microphone of the plurality of microphones, determines if the determined other vehicle is accelerating;
wherein the ECU, responsive to determination of the presence of the other vehicle in the side traffic lane, determines a tire-road acoustic profile for the equipped vehicle, and wherein the ECU determines if the determined other vehicle is accelerating by canceling out the determined tire-road acoustic profile from the output of the at least one microphone; and wherein, responsive to determination that the determined other vehicle is accelerating, the vehicular driving assistance system generates an alert to the driver of the equipped vehicle.

12. The vehicular driving assistance system of claim 11, wherein the ECU determines the tire-road acoustic profile for the equipped vehicle via processing at the ECU of an output of another microphone of the plurality of microphones that is disposed at the other side of the equipped vehicle from the side traffic lane in which the determined other vehicle is traveling.

13. The vehicular driving assistance system of claim 11, wherein the determined tire-road acoustic profile is based at least in part on a determined road condition of the road along which the vehicle is travelling.

14. The vehicular driving assistance system of claim 11, wherein the sensors comprise exterior viewing cameras disposed at the equipped vehicle.

15. The vehicular driving assistance system of claim 11, wherein the plurality of sensors comprises a plurality of radar sensors disposed at the equipped vehicle.

16. The vehicular driving assistance system of claim 11, wherein the plurality of sensors comprises a plurality of lidar sensors disposed at the equipped vehicle.

17. A vehicular driving assistance system, the vehicular driving assistance system comprising:
a plurality of sensors disposed at a vehicle equipped with the vehicular driving assistance system, each sensor of the plurality of sensors sensing a respective region exterior of the equipped vehicle;
an electronic control unit (ECU) comprising electronic circuitry and associated software, the electronic circuitry comprising a data processor for processing sensor data captured by the sensors;
a plurality of microphones disposed at the equipped vehicle and sensing sounds emanating from exterior of the vehicle;
wherein the ECU comprises a sound processor operable to process outputs of the plurality of microphones;
wherein, with the equipped vehicle traveling along a traffic lane of a road, the ECU, responsive to indication of an intended lane change of the equipped vehicle, and via processing at the data processor of sensor data captured by at least one sensor of the plurality of sensors, determines presence of another vehicle in a side traffic lane adjacent to the traffic lane in which the equipped vehicle is traveling;
wherein, responsive to determination of the presence of the other vehicle in the side traffic lane, the ECU, via processing an output of at least one microphone of the plurality of microphones, determines if the determined other vehicle is accelerating;
wherein the ECU, responsive to determination of the presence of the other vehicle in the side traffic lane, determines a tire-road acoustic profile for the equipped vehicle, and wherein the ECU determines if the determined other vehicle is accelerating by canceling out the determined tire-road acoustic profile from the output of the at least one microphone;
wherein, responsive to determination of the presence of the other vehicle in the side traffic lane, the ECU, via processing of outputs of the at least one microphone of the plurality of microphones, determines if the determined other vehicle sounds its horn; and
wherein, responsive to at least one selected from the group consisting of (i) determination that the determined other vehicle is accelerating and (ii) determination that the determined other vehicle sounds its horn, the vehicular driving assistance system generates an alert to a driver of the equipped vehicle.

18. The vehicular driving assistance system of claim 17, wherein the ECU determines the tire-road acoustic profile for the equipped vehicle via processing at the ECU of an output of another microphone of the plurality of microphones that is disposed at the other side of the equipped vehicle from the side traffic lane in which the determined other vehicle is traveling.

19. The vehicular driving assistance system of claim 17, wherein the determined tire-road acoustic profile is based at least in part on a determined road condition of the road along which the vehicle is travelling.

20. The vehicular driving assistance system of claim 17, wherein the intended lane change is indicated via activation of a turn signal by the driver of the equipped vehicle.

21. The vehicular driving assistance system of claim 17, wherein the intended lane change is indicated by an autonomous driving system of the vehicle, and wherein, responsive to determination that the determined other vehicle is accelerating, the vehicular driving assistance system generates a signal to the autonomous driving system to not complete the intended lane change.

\* \* \* \* \*